(No Model.)

W. V. ESMOND.
PHOTOGRAPHIC CAMERA SHUTTER.

No. 547,541. Patented Oct. 8, 1895.

Witnesses:
Jno. A. Christianson
W. C. Corlies

Inventor:
William V. Esmond.
By Julius Moses.
Atty.

ANDREW B GRAHAM. PHOTO-LITHO. WASHINGTON, D.C.

UNITED STATES PATENT OFFICE.

WILLIAM V. ESMOND, OF CHICAGO, ILLINOIS, ASSIGNOR OF ONE-HALF TO PATRICK HENRY BETTMAN, OF SAME PLACE.

PHOTOGRAPHIC-CAMERA SHUTTER.

SPECIFICATION forming part of Letters Patent No. 547,541, dated October 8, 1895.

Application filed January 8, 1895. Serial No. 534,231. (No model.)

*To all whom it may concern:*

Be it known that I, WILLIAM V. ESMOND, a citizen of the United States, residing at Chicago, Cook county, Illinois, have invented certain new and useful Improvements in Shutters for Photographic Cameras, of which the following is a specification.

The object of my invention is to provide a simple, economical, and efficient shutter for use in connection with photographic cameras; and the invention consists in the features and combinations hereinafter described and claimed.

Figure 1:
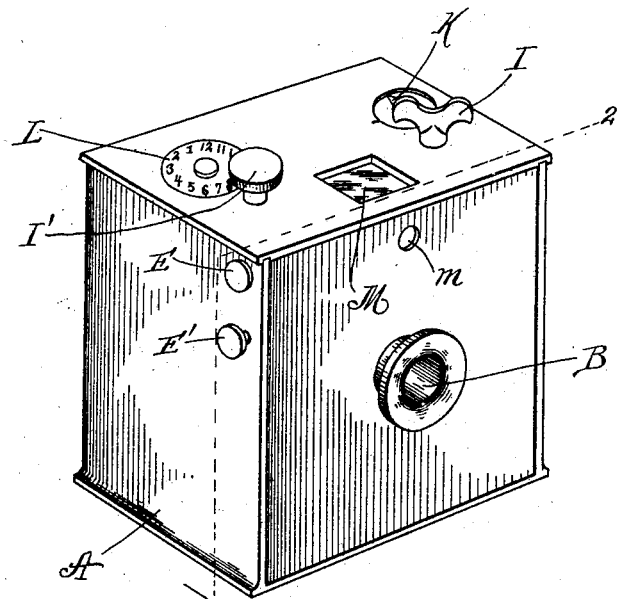
Figure 2:
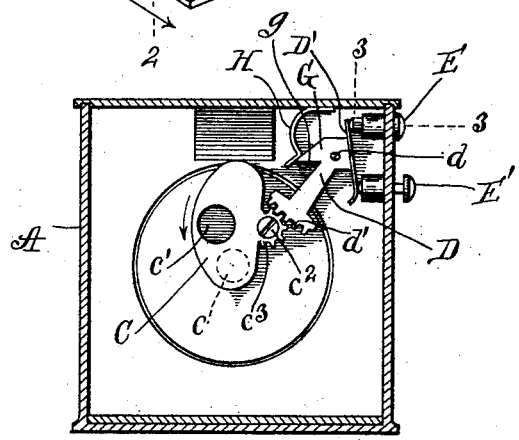
Figures 3, 4:
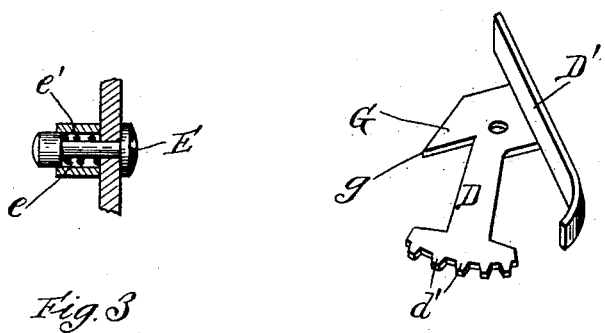

In the drawings, Figure 1 is a perspective view of one style of camera to which my invention may be applied; Fig. 2, a vertical section taken on line 2 2 of Fig. 1, looking in the direction of the arrow; Fig. 3, an enlarged detail of one of the push-pins for actuating the shutter, and Fig. 4 a detail perspective view of the actuating-lever.

In describing and illustrating my invention I have illustrated and described only so much of a camera as is necessary to thoroughly understand the working of my improvement and will leave out of consideration all of the other parts, as I deem it unnecessary, from the fact that such parts as are not herein shown and described are well known to those skilled in the art.

In constructing my improvement I use a camera having a case A of any desired shape and size, which is provided with a lens-holder B of any usual form and size. I attach a shutter C, Fig. 2, to the interior of the front wall of the case, so as to close the lens-opening $c$, through which the image or light is thrown on the film. This shutter is pivoted to the case at $c^2$ in such manner that during the reciprocal vibrating motion it will bring its opening $c'$ to register with the lens-opening when at about its center of motion and close such lens-opening when it is substantially at either limit of motion. As shown in the drawings, Fig. 2, the shutter is at one limit of motion, and the lower part of it closes the lens-opening. When it is desired to take a picture, the shutter is actuated to bring its opening in line with the lens-opening and is carried to its other limit of motion, its imperforate portion covering the lens-opening. By this arrangement it will be seen that the shutter is always set and ready for use, thus avoiding the necessity of setting it after each exposure.

To actuate the shutter at the desired time I pivot an actuating-lever D to the inner side of the case at $d$, and provide it with gear-teeth $d'$, arranged to engage with teeth $c^3$ on the shutter, so that the motions of this actuating-lever will operate the shutter, as desired. The actuating-lever is substantially T-shaped and is provided with a right angle T portion D′, which forms arms against which push-pins E and E′ may impinge, so that the lever may be actuated and thereby vibrate the shutter. These push-pins are inserted in interiorly-projecting bosses $e$ on the case, and have inserted between their shoulder portion and the case small spiral springs $e'$ to always tend to keep the pins at their inner limit of motion in contact with the actuating-bar, though these springs are not essentially necessary, being merely for the purpose of assisting the operator in selecting the pin that is to be pushed inward to operate the shutter.

To hold the shutter in either limit of its motion against accidental displacement and close the lens-opening to prevent admission of light, the actuating-bar is provided with a projecting cam portion G, (see Fig. 4,) arranged to be contacted by a locking-spring H, so that as the actuating-lever is at one limit of motion, as shown in Fig. 2, the locking-spring rests on one side of the cam, thereby keeping the parts in such position; but when the push-pin E′ is pushed inwardly the tension of the spring H is overcome until the apex or dead-point $g$ of the cam is passed, when the locking-spring rests on the opposite side of the cam and will assist in throwing the shutter to the opposite limit of motion, as well as holding the parts in such position until more than ordinary force is used on the opposite push-pin.

For convenience in construction and operation I place the push-pins on the main portion of the case and the shutter mechanism on a separate holder or frame, as this leaves the shutter in a fixed position when removed from the case.

In Fig. 1, I I′ are the roll-holders, of any desired construction; K, the indicating-point to tell when a sufficient amount of film has passed into or out of the field of view; L, the registering-indicator; M, the finder, and $m$ the finder-lens, all of which may be of any desired construction, and do not form any material or novel feature of this invention.

In using my shutter the parts are placed in position as above described, and it will be supposed that a proper film or plate is in position in the camera and the object to be photographed brought within range. The push-pin E' is then pushed inwardly. This vibrates the actuating-lever in the direction indicated by the arrow, giving to the shutter an opposite motion, as indicated by the arrow adjacent thereto. As the dead-point of the cam on the actuating-lever is brought to the other side of the locking-spring—which is about the same time that the opening of the shutter and the lens-opening are brought into register—the parts are operated rapidly by the assisting action of the spring and the shutter is carried to its opposite limit of motion, giving what might be termed an "instantaneous" exposure. The locking-spring, as above described, then holds such parts in that position until it is desired to take another picture. To operate the mechanism to take time-exposures either push-pin which is in the outer position may be pushed inwardly slowly and easily until the dead-point of the cam rests upon the point of the locking-spring, when it may be allowed to rest there the desired length of time. A further inward push at the expiration of the predetermined time vibrates the shutter to close the lens-opening.

Among the many advantages of my improvement the principal one is that I have provided a simple, economical, and efficient shutter that is always in position to be actuated and admit light to the sensitive plate, thus avoiding all necessity of arranging or setting the shutter. When the shutter has been actuated by either push-pin, it has simultaneously opened and closed the lens-opening, and is again in position to be operated and expose another plate. This advantage will be appreciated by those skilled in the art and by those familiar with the use of photographic cameras when it is remembered that in ordinary constructions if the operator should forget to set the shutter an opportunity for making a valuable negative may be lost. This is especially the case where instantaneous exposures are necessary.

While I have described my invention with more or less minuteness as regards details of construction and as being embodied in precise forms, I do not desire to be limited thereto unduly any more than is pointed out in the claims. On the contrary, I contemplate all proper changes in form, construction, and arrangement, the omission of parts and substitution of equivalents, as circumstances may suggest or render expedient.

I claim—

1. In a shutter for photographic cameras, the combination of a holder provided with a lens-opening, a reciprocable shutter mounted thereon provided with an opening to register with the lens-opening when the shutter is substantially at the center of its motion and close the lens-opening when at or near either limit of its motion, an actuating lever engaging the shutter to throw it from either of its limits of motion to the other, a projecting cam-portion on such lever, a locking-spring arranged to contact with the cam-portion of the lever to assist such lever in its vibrations and hold it at their limit of motion, and push-pin mechanism arranged to operate the actuating lever from either limit of its motion, substantially as described.

2. In a shutter for photographic cameras, the combination of a holder provided with a lens or light opening, a vibrating shutter mounted thereon provided with an opening to register with the lens-opening when the shutter is substantially at the center of its motion and close the lens opening when at or near either limit of its motion, gear teeth on such vibrating shutter, an actuating lever provided with gear-teeth engaging the teeth of the vibrating shutter to throw it from one limit of its motion to the other, a cam portion on such actuating lever, a locking-spring arranged to contact the cam portion of such lever to assist in throwing such lever after it has passed a center of motion and hold it at its limit of motion, and two push-pins normally contacting with the actuating lever to throw it from one limit of its motion to the other and thereby open and close the shutter at each operation of the actuating lever, substantially as described.

3. In a shutter for photographic cameras, the combination of a holder provided with the usual lens or light opening and reciprocating movable shutter mounted adjacent thereto provided with an opening adapted to register with the lens-opening and to admit light when the shutter is substantially at its center of motion and close the lens-opening when the shutter is at either of its limits of motion, and a substantially T-shaped lever engaging with the reciprocating shutter to throw it from one limit of motion to the other when one or the other arm of the T-shaped portion is operated, substantially as described.

4. In a shutter for photographic cameras, the combination of a holder provided with the usual lens-opening and a reciprocating movable shutter mounted adjacent thereto provided with an opening adapted to register with the lens-opening and admit light when the shutter is substantially at its center of motion and close the lens-opening when the shutter is at either of its limits of motion, and a substantially T-shaped lever having its T portion extending at an angle to the plane of motion, and push-pins contacting one on each side of the T arm to operate such actuating lever and thereby operate the shutter, substantially as described.

5. In a shutter for photographic cameras, the combination of a holder having the usual lens-opening and reciprocating movable shutter mounted adjacent thereto provided with an opening adapted to register with the lens-opening and admit light when the shutter is substantially at its center of motion and close the lens-opening when at either of its limits of motion, and push-pin mechanism arranged in the case-portion proper and separate from the shutter to actuate such shutter mechanism and remain in the case when such shutter is removed, substantially as described.

WILLIAM V. ESMOND.

Witnesses:
JESSE LOWENHAUPT,
ROSE A. GRADY.